Nov. 4, 1952 E. J. THURBER 2,616,260
ROTARY HYDRAULIC COUPLING
Filed July 9, 1946 3 Sheets-Sheet 1

INVENTOR
Edward J. Thurber
By Scrivener and Parker
Atty's

Nov. 4, 1952     E. J. THURBER     2,616,260
ROTARY HYDRAULIC COUPLING

Filed July 9, 1946     3 Sheets-Sheet 3

INVENTOR
Edward J. Thurber
By Scrivener and Parker
Att'ys

Patented Nov. 4, 1952

2,616,260

UNITED STATES PATENT OFFICE 2,616,260

ROTARY HYDRAULIC COUPLING

Edward John Thurber, New Orleans, La., assignor to The Thurber Corporation, New Orleans, La., a corporation of Louisiana Application July 9, 1946, Serial No. 682,237

28 Claims. (Cl. 60—54)

This invention relates to hydraulic variable-speed power transmissions and more particularly to transmissions of the rotary type wherein the torque is multiplied and transmitted from a rotary impeller member to a rotary turbine member through the circulation of a working fluid between said members.

Hydraulic transmissions of the above type which have heretofore been proposed, have been so constructed and arranged as to cause the working fluid to flow in a toroidal path during operation, and the design of the impeller, turbine and other members has been such that a considerable portion of these members has been positioned in the path of the fluid returning to the impellers. Since a substantial amount of heat is generated and stored in the fluid during operation of the system, it will readily be appreciated that the portions of the members which are disposed in the path of the fluid returning to the impeller obstruct the flow of the fluid and also act as heat generators and reservoirs and in effect, trap a considerable amount of heat within the interiors of the paths of fluid flow. In addition, a quantity of idle fluid is contained within the central portion of the working fluid path, due to the construction of the prior devices, and such fluid constitutes a further reservoir for the trapping of heat in the working fluid.

This trapping of heat has been such a serious problem in the prior transmissions, that various types of complicated systems have been devised for conducting the fluid to a point externally of the unit where it is subjected to a cooling action and thereafter returned to the unit. However, such arrangements have required extraneous pumping and piping constructions so that their installation and maintenance is exceedingly complicated and expensive, and is moreover accompanied by a loss in overall efficiency.

It is accordingly an important object of the present invention to provide a hydraulic power transmission of the rotary type which is so constituted as to avoid the disadvantages and objectionable features of the prior systems.

Another object of the present invention resides in the provision of a hydraulic power transmission incorporating a novel cooling arrangement for the working fluid, which dispenses with the necessity of having external cooling radiators, piping and pumps for efficient operation of the system.

A further object comprehends a transmission of the above type wherein the casing of the transmission includes a novel construction for the effective and rapid cooling of the working fluid during operation of the system.

Still another object is to provide a hydraulic power transmission which eliminates the idle oil within the center of the path of the working fluid, which has been inherent in the prior constructions, and which also dispenses with the stationary blades and deflectors of the prior devices that decreased the fluid velocity and generated heat in the fluid in deflecting the path of the flow of fluid.

A further object is to provide a hydraulic power transmission with rotatable elements for redirecting the fluid under the influence of centrifugal force, and at the same time to increase the fluid velocity.

Another object resides in providing a novel construction for simultaneously controlling the dissipation of heat from the working fluid and regulating the delivery of torque by the transmission unit at any given speed of the driving shaft.

Another object of the present invention is to provide an improved transmission of the character described that combines the characteristics of a torque converter in multiplying and transmitting torque and that of a fluid coupling in transmitting torque.

Another object is to provide functional means for eliminating the idle drag customary in prior fluid transmissions.

Still another object is to eliminate the necessity of another clutch to connect the impeller to the driving shaft and for disconnecting the driving and driven shafts.

A further object is to provide new and improved means for withdrawing some or all of the fluid from the working circuit of the unit and for storing same within the main casing, together with means for returning some or all of the fluid to the working circuit.

Still another object is to provide a novel multi-stage compound hydraulic transmission that is infinitely variable in accordance with the speed of the driving shaft and/or at the will of the operator, and independently of the driving shaft speed.

A still further object comprehends an arrangement of impeller and turbine members which cooperate to provide a novel multi-stage compound fluid transmission which functions at a high efficiency under all conditions of operation.

Yet another object comprehends a novel arrangement of parts in a transmission of the foregoing character including heat dissipating means carried by the casing of the transmission together with means controllable by the operator for causing rotation of the casing to not only govern the operation of the heat dissipating means but also to exercise a control over the torque transmitting characteristics of the transmission.

It has also been found that with the prior devices, the design of the impellers, turbines, and stationary reactionary members has been such that during operation at certain relative speeds, these parts have so disturbed and interrupted the fluid flow, that the torque transmission was greatly diminished. Also it was found that the fluid discharge at the last stage was at such a low pressure, that external means were required in order to pressurize the fluid to prevent cavitation at the impellers.

In the present invention the aforementioned disadvantages have been corrected without altering the functional characteristics of the essential elements, namely, the impellers, turbines and reactionary members. However, two new elements have been added, to wit, rotating reactionary rings provided with fluid outlets, and rotating exhaust heads.

Other objects and novel features of the invention will appear more fully hereinafter from a consideration of the following detailed description when taken in connection with the accompanying drawings in which several embodiments of the invention are illustrated. It is to be expressly understood however, that the drawings are utilized for purposes of illustration only and are not to be taken as a definition of the limits of the invention, reference being had for this purpose to the appended claims.

In the drawings, wherein similar reference characters refer to similar parts throughout the several views;

Fig. 5 is a partial sectional view of a positively acting ventilating arrangement which may be employed with the transmissions of either Figs. 1 or 4.

Figure 1:
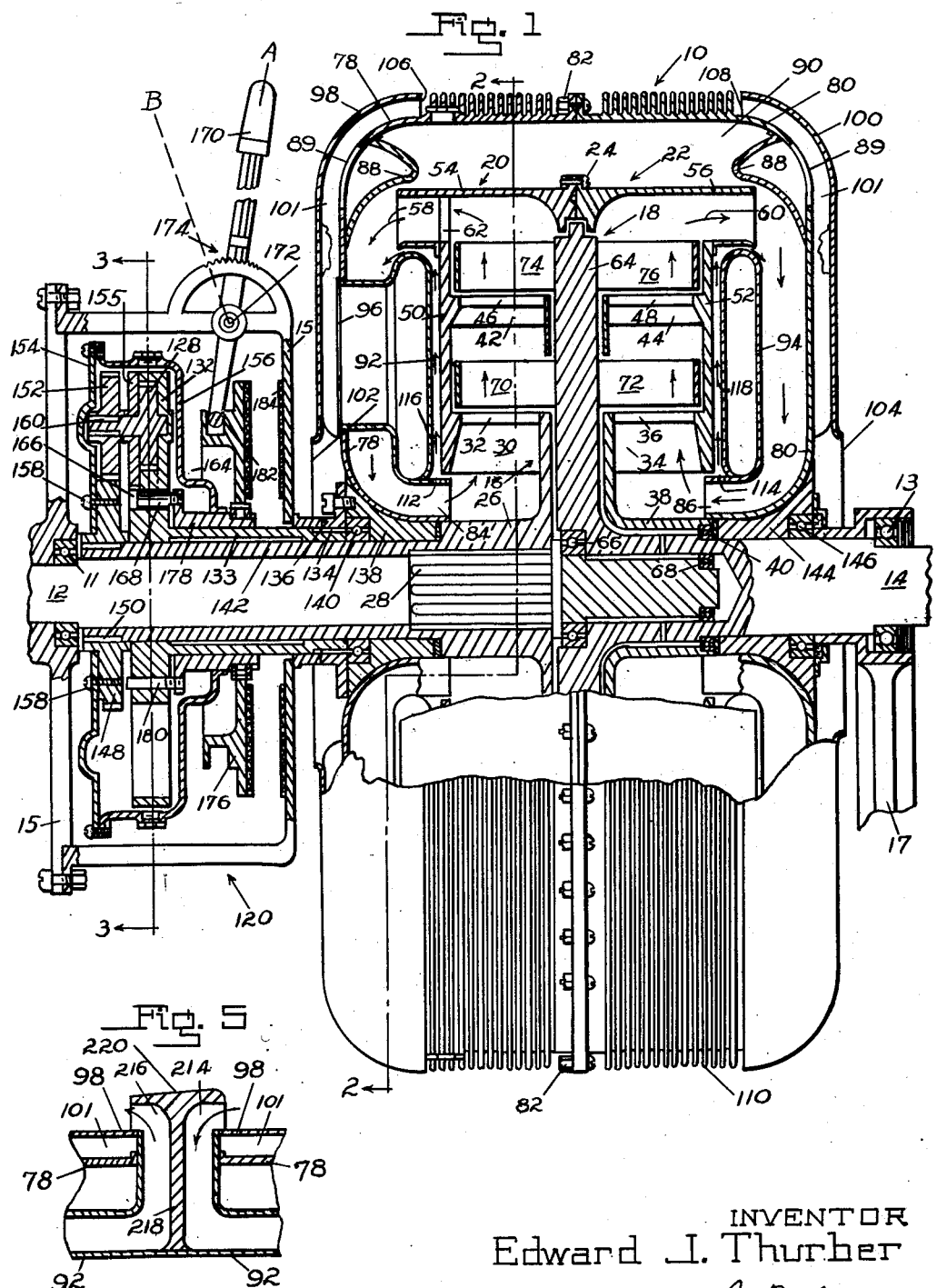
Fig. 1 is a side view partly in section of a hydraulic power transmission constructed in accordance with the principles of the present invention.

Referring more particularly to Fig. 1, the novel hydraulic power transmission constituting the present invention is illustrated therein, as comprising a fluid unit 10 arranged to drivably connect a driving shaft 12 and a driven shaft 14, these shafts being respectively rotatably supported by bearings 11 and 13 mounted upon suitable supports 15 and 17. As will appear more fully hereinafter, the fluid unit 10 is adapted to contain a suitable supply of a working fluid which cooperates with a multi-stage impeller member 16 and a multi-stage turbine member 18 to variably transmit torque from the driving shaft 12 to the driven shaft 14 in a highly efficient manner.

Figure 2:
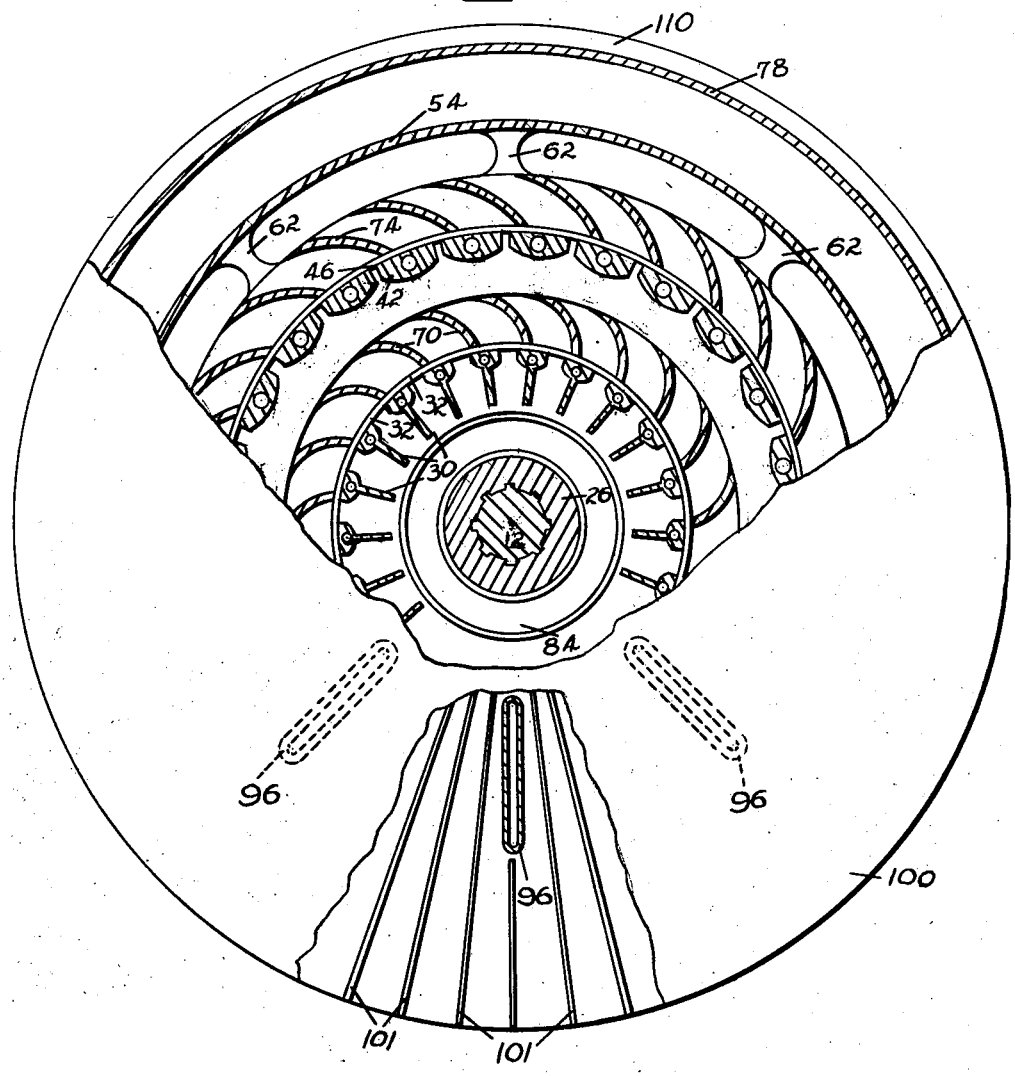
Fig. 2 is a partial sectional view taken substantially along line 2—2 of Fig. 1.

One of the features of the present invention resides in the novel construction of the fluid unit 10 which provides a multi-stage compound unit so constructed and arranged as to derive maximum efficiency from the working fluid and to dissipate the heat therefrom in a novel and highly efficient manner. More particularly, the impeller 16 is preferably of the compound type, and comprises a forward member 20 and a rear member 22, these being connected at their periphery, by a series of bolts 24. As shown, the impeller member 20 includes a hub 26 which is suitably keyed to the driving shaft 12, as by means of splines 28, and the hub is provided with a plurality of circumferentially spaced primary buckets 30 having outlet nozzles 32 therebetween, see Fig. 2. In like manner, the rear impeller member 22 is provided with similar primary buckets 34 and nozzles 36 and member 22 includes a central hub portion 38 which is rotatably mounted on the driven shaft through a bearing 40. Spaced radially outwardly from the primary buckets 30 and 34 are secondary impellers or rotating guide rings 42 and 44, these being provided with smaller nozzles 46 and 48 and being respectively attached to side members 50 and 52. As shown, the side members 50 and 52 are extended a further distance radially outwardly to respectively support forward and rear impeller exhaust heads 54 and 56, these constituting annular impeller chambers for receiving the working fluid which is discharged radially from the turbine members 74, 76. Thus the exhaust heads or impeller members 54, 56 stop the radial flow of the fluid and turn it axially as denoted by arrows 58 and 60. Referring to Fig. 2, it will be noted that the forward exhaust head 54 is connected to the side member 50 of the forward impeller 20 as by means of a plurality of spaced webs or vanes 62. The rear exhaust head 56 is similarly supported, but preferably such webs or vanes are staggered with respect to the webs or vanes 62.

In order to transmit torque from the impellers 20 and 22 to the driven shaft 14 through the fluid circulating in the paths 58 and 60, a novel turbine construction is provided by the present invention. As shown, such construction includes a turbine wheel 64 which is formed integrally with or otherwise suitably connected with the driven shaft 14, and is rotatably supported upon the right end portion of the driving shaft 12 as by means of bearings 66 and 68. Circumferentially extending forward and rear primary turbine blades 70 and 72 are carried by the turbine wheel 64 and respectively extend between the forward primary and secondary impellers 30 and 42 on the one hand and between the rear primary and secondary impellers 34 and 44 on the other to receive the fluid flowing in the respective circuits 58 and 60. In like manner, the turbine wheel 64 is provided with secondary forward and rear blades 74 and 76 which receive the fluid from the secondary impellers 42 and 44 and deliver the fluid to the respective exhaust heads 54 and 56. Thus the torque of the drive shaft 12 is delivered to the driven shaft 14 through the cooperation between the forward impellers 30, 42 and the forward turbine blades 70, 74 in conjunction with the fluid in path 58, and through the cooperation between the rear impellers 34, 44 and the rear turbine blades 72, 76.

In constructing the primary and secondary stages of the forward and rear impellers 20 and 22 respectively, it is preferable that the total effective area of each stage be approximately the same in order that each stage may accommodate substantially the same amount of fluid. However, since the total peripheral area of the secondary impellers 42 and 44 is greater than the primary buckets 30 and 34 and since the secondary impellers are further removed from the axis of rotation, it will be appreciated that the pressure and velocity of the fluid will be increased in passing from the primary turbine stage, through the secondary impeller stage to the secondary turbine stage. It will also be understood that a further increase in pressure and velocity will be imparted to the fluid in progressing through the secondary turbine stage to the exhaust heads 54 and 56. While the impeller members have herein been shown as being of the bucket type, it will be appreciated that they may be of the bladed type, if desired.

In addition to the foregoing advantageous features, the present invention comprises a novel construction for controlling and completing the circuits of the fluid paths 58 and 60, and providing internal and external cooling means for effectively dissipating heat generated in the fluid during operation of the system. As shown, such construction comprises forward and rear casing sections 78 and 80, which may be secured to each other by a series of bolts 82, and which are provided with annular inlet chambers 84 and 86 for returning the fluid to the respective primary buckets 30 and 34. Each casing section is formed with an annular fluid guide ring 88 and the inner peripheral portion of the sections forms a circumferential chamber 90 for a purpose which will appear more fully hereinafter.

The novel internal cooling means referred to, is constituted by annular interior cooling chambers 92 and 94, which as shown in Fig. 1, are positioned within the central portions of the toroidal paths defined by the working fluid during operation of the fluid unit 10. The forward interior chamber 92 is carried by the forward casing section 78 by means of a plurality of hollow fluid guide vanes 96, which may be extended up to the fluid guide ring 88 and adjacent to the exhaust heads or impeller members 54 and 56, see Figs. 1 and 2, which communicate with the space defined by the exterior of casing section 78 and a cover or shield 98 and the forward interior chamber 92. In like manner, the rear interior chamber 94 is provided with a plurality of hollow fluid guide vanes, not illustrated, which communicate with the space between the rear casing section 80 and a shield 100 and the rear interior chamber 94. External cooling means are provided by a plurality of radially extending spaced-apart air blower fins 101 positioned between and carried by the casing section 78 and shield 98, and between the casing section 80 and shield 100, annular openings 102 and 104 being provided whereby cooling air may be conducted from the exterior, between the fins and past and into the open ends of the hollow fluid guide vanes 96 communicating with the interior chambers 92 and 94, and to the exterior from outlet openings 106 and 108. It will therefore be apparent that each fluid circuit includes an air cooling duct disposed within the central portion of the toroidal circuit through which external cooling air may be conducted in order to quickly and effectively dissipate the heat generated in the working fluid. In addition, the air blower or cooling fins 101 materially assist in the cooling of the fluid and, if desired, circumferentially extending cooling fins 110 may be provided on the exterior of the unit to further augment the dissipation of heat. It is also contemplated that additional cooling of the fluid may be obtained by providing a series of openings 112 and 114 in the inlet chambers 84 and 86 respectively, to allow a portion of the returning fluid in each circuit to flow in the paths 116 and 118 and in contact with the cooling interior chambers 92 and 94.

From the foregoing it will be readily understood that upon rotation of the driving shaft 12, the forward and rear impellers 20 and 22, and the primary and secondary impellers and the exhaust heads 54 and 56 respectively secured thereto, will all be rotated at shaft speed and that the working fluid will be conducted through the successive turbine stages and in the toroidal paths 58 and 60, whereby a variable torque will be delivered to the driven shaft 14 under different operating conditions. Internal and external cooling means constituted by the interior chambers 92, 94, the openings 112, 114, and the fins 101 and 110 are provided for effectively dissipating the heat generated in the working fluid and it will be noted that heavy metal parts and idle fluid within the central portion of the toroidal working circuits have been completely eliminated. In addition, the use of stationary deflecting members in the center of the system, which would cause the generation of heat in the fluid and decrease fluid velocity, is avoided by the construction heretofore described. If desired, additional heat dissipating means may be provided for cooling the annular chamber 90, see for example the fluid deflecting rings 88 which may be vented to the airflow past fins 101 through vents 89.

Figure 3:
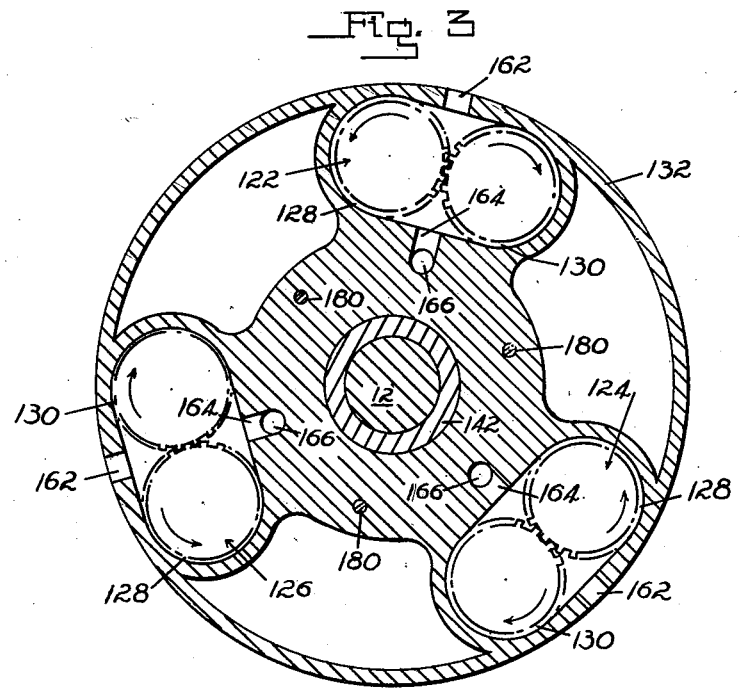
Fig. 3 is a sectional view taken substantially along line 3—3 of Fig. 1 and illustrates the hydraulic gear pump arrangement of the casing drive unit.

Means are provided by the present invention for rotating the casing sections 78 and 80 in order to vary the effectiveness of the internal and external cooling means for the working fluid and preferably such means is arranged to govern or control the effectiveness of the transmission of the torque by the fluid unit 10. As shown, such means may be controlled at the will of the operator and includes a drive unit comprising an infinitely variable torque transmitter 120 of the hydrostatic type. More particularly, and referring to Figs. 1 and 3, the unit 120 includes a plurality of gear pumps 122, 124 and 126, each of which includes a pair of intermeshing gears 128 and 130, all of the gears being suitably mounted upon a rotor 132 provided with a sleeved extension 133 which is keyed or otherwise secured at 134 to the forward casing section 78 through rings 136 and 138. As shown, the ring 138 is rotatably mounted by a bearing 140 upon a forwardly extending sleeved extension 142 of the primary impeller hub 26, while a ring 144 integral with the rear casing section 80 is rotatably mounted upon the driven shaft 14 by means of a bearing 146. It will therefor be understood from this construction, that both of the casing sections and the elements attached thereto, including the hollow fluid guide vanes 96 may be rotated with respect to the driving and driven shafts through rotation of the rotor 132. It is preferred to rotate the casing sections 78 and 80 in the same direction as the circumferential flow of the fluid after it leaves the exhaust heads or impeller members 54, 56.

In order to drivably connect the gear pumps 122, 124 and 126 with the driving shaft, a driving gear 148 surrounds the sleeve 142 and is secured thereto as by means of a positive clutch 150, the driving gear 148 meshing with the three pump drive gears, one of which is illustrated in Fig. 1 at 152. As shown, interconnected casing sections 154 and 156 are rotated with the driving gear 148, being secured thereto as by means of screws 158, and each pump drive gear 152 is keyed or otherwise secured at 160 to the shaft of the pump gears 128, it being observed that such shafts pass through a cover plate 155 carried by the rotor 132, which covers the pumps 122, 124 and 126. Thus, by reason of this construction it will be seen that rotation of the impeller 16 will cause rotation of the gears 148 and 152, gear pumps 122, 124 and 126, as well as casing sections 154 and 156, the direction of rotation of the gears 128 and 130 of the gear pumps 122, 124 and 126 being as shown by the arrows in Fig. 3.

For the purpose of controlling the speed of rotation of the rotor 132 and hence the casing sections 78 and 80 of the fluid unit 10, the casing sections 154 and 156 of the drive unit 120 contain a quantity of hydraulic working fluid which may be conducted to the gear pumps 122, 124 and 126 by way of inlets 162 and from the gear pumps back to the casing sections by way of outlets 164. As shown, Figs. 1 and 3, each of the outlets communicates with a transverse bore 166 adapted to receive a cylindrical valve 168, and the construction is such that such valves may completely close the outlets 164 or gradually open communication between the outlets and the valve bores to graduate the delivery of fluid from the gear pumps to the interior of the casing sections 154 and 156. It will be readily understood from the foregoing, that in the event the valves 168 are closed, then the working fluid is locked within the rotor 132 and that therefore the latter and the casing sections 78 and 80 of the pump unit rotate at the same speed and in the same direction as the impellers and the driving shaft. On the other hand, should the valves 168 be fully opened, the gear pumps 122, 124 and 126 will merely pump the fluid from the inlets 162 through the outlets 164 and pump bores 166 without increase of pressure and hence, the rotor 132 and casing sections 78 and 80 can remain stationary. Any speed of rotation of the rotor 132 from zero to maximum may readily be obtained by controlling the degree of closure of the valves 168 in order to restrict the exhaust of fluid from the gear pumps.

A novel construction is provided by the invention to variably position the valves 168 in order to achieve the foregoing variable control of the speed of the rotor 132, and the speed of the casing sections 78 and 80 of the fluid unit 10. As shown, such construction includes a manually operable member 170 which is pivotally mounted at 172 to the stationary support 15. Preferably, the member 170 is provided with a detent and rack construction 174 and the lower end of the member cooperates with a yoke 176 which is secured to a valve operating flange 178. To the latter, the three valves 168 are fixedly secured so that movement of the member 170 in a counterclockwise direction, serves to withdraw the valves 168 from the bores 166.

It will be recalled from the foregoing, that when the valves 168 are fully open, the rotor 132 can remain stationary. When this occurs however, there may be some tendency for the casing sections 78 and 80 to rotate, due to the circumferential action of the working fluid in the unit 10, upon the hollow fluid guide vanes 96. Such rotating would also cause a rotating of the rotor 132. In order to positively prevent any such rotating of these parts, the valve operating flange 178 carries a plurality of brake pins 180 which are receivable within openings provided in the rotor 132, and the yoke 176 and the stationary mounting 15 are provided with cooperating brake linings 182 and 184 respectively. Thus when the member 170 is moved from position A to position B, it will readily be appreciated that the linings 182 and 184 will engage and any tendency of the rotor 132 and casings 78 and 80 to rotate will be positively prevented through the brake pins 180.

In the operation of the form of the invention shown in Figs. 1 and 2, it will be understood that the casing of the drive units 10 and 120 are first charged with a proper quantity of working fluid through suitable filling plugs. In the case of the fluid unit 10, the amount of fluid required will be that quantity necessary to fill the circuits 58 and 60 when the unit is in operation, while in the case of the drive unit 120, an amount of fluid sufficient to cover the inlets of the fluid pumps when in operation, is required.

When the unit is at rest, that is when the driving shaft 12 is not rotating, all of the fluid will be in the bottom half of the fluid unit 10, and most of this fluid will be in the area occupied by the bottom half of the impellers, turbines and exhaust heads 54 and 56, together with the space adjacent thereto. Only a very small portion of the fluid will be in the bottom area of the reservoir 90 below the exhaust heads 54 and 56. In starting, the control member 170 is moved to position B thus bringing the brake facing 182 into contact with the fixed brake facing 184 to thereby lock the casing 78, 80 in a stationary position. Under these conditions, when the impellers and exhaust heads 54, 56 are rotated, the fluid circuit will be activated and established, and all of the fluid in the area of the turbines, impellers and the exhaust heads 54 and 56 will be circulated, thus leaving only a small portion of the fluid in the bottom of the reservoir 90 below the exhaust heads 54, 56.

It is pointed out that the fluid is discharged radially from the secondary turbine members 74, 76 into the exhaust heads or impeller members 54, 56. Once the fluid is in the impeller members 54, 56 the radial flow of the fluid is stopped and is directed axially. Since the impeller members 54, 56 are rotating at a further distance from the axis of rotation than the other impellers, greater velocity and pressure is imparted to the fluid to move it axially through the impeller members 54, 56, and the fluid under high velocity and pressure after moving axially, is turned radially inward on striking the fluid guide rings 88. It will be recalled that in the above described operation, the casing 78, 80 is being held stationary. Therefore, any fluid that may spray into the chamber 90 will drop by gravity to the bottom of this chamber and when sufficient fluid accumulates therein it will rise to the level of the fluid working circuits 58, 60 where the fluid will again enter said fluid circuits through the opening between the impeller members 54, 56 and the fluid guide rings 88. Since the fluid is moving axially under constant high pressure and velocity, as it passes the opening between the impeller members 54, 56 and the fluid guide rings 88, the fluid working circuits 58, 60 will carry with it any surplus fluid entering the fluid circuits and thus keep the level of the surplus fluid in the bottom of chamber 90 down to the level of the fluid circuits 58, 60.

In the operation of the fluid unit 10, it will be readily understood that the fluid is thrown radially outwardly from the primary impeller buckets 30 and 34 to impinge upon the primary turbine blades 70 and 72 in order to rotate the turbine wheel 64 and driven shaft 14. Thereafter, the fluid flows to the secondary impeller rings 42 and 44 where its direction of flow is changed by reaction to centrifugal force and additional velocity will be imparted to the fluid since the secondary impellers are at a greater distance from the rotational axis than the primary impellers. After leaving the secondary impeller rings 42 and 44, the fluid strikes the secondary turbine blades and exerts a greater force thereon than upon the primary turbine blades. Thus an additional torque will be imparted to the turbine wheel 64 and to the driven shaft. After exerting pressure upon the secondary turbine blades 74 and 76, the fluid passes to the exhaust heads 54 and 56 where its direction of flow is again changed by centrifugal force and here again the velocity of the fluid is increased, due to the fact that such exhaust heads are further from the rotational axis. Thus it will be observed that the direction of flow of the fluid has twice been reacted on by centrifugal force and its course changed; also the velocity of the fluid in passing from the primary impeller buckets through the successive turbine and impeller stages has been materially increased.

The fluid discharging from the impeller members or exhaust heads 54, 56 is moving axially under constant high pressure and velocity and the axial direction of the toroidal flow of the fluid is changed and guided radially inward by the guide rings 88. As the fluid moves radially inward, its circumferential flow is stopped and its direction is changed when passing through the area occupied by the stationary hollow fluid guide vanes 96. On leaving this area, the direction of the flow of the fluid is again changed by the inner hub of the casings 78, 80 and directed back to the primary buckets 30, 34. Any heat generated by the fluid circulation is expelled from the interior chambers 92, 94 through the cavities in the hollow fluid guide vanes 96 connected with the interior chambers 92, 94 and with the exterior air stream passing between the casings 78, 80 and the cover plates 98, 100.

During the aforementioned operation of the fluid unit, a maximum torque will be delivered to the driven shaft for any given speed of the driving shaft. It will also be understood that the aforementioned circulation of the working fluid radially outwardly from the axis of rotation has been due to centrifugal force imparted to the fluid by the rotating impeller, while the return of the fluid toward the axis is due to the velocity imparted to the fluid by the rotation of the impeller exhaust heads 54 and 56. Since the velocity of the fluid issuing from the exhaust heads 54 and 56 is quite high, it may be possible under some circumstances that the returning fluid might flood the intake of the primary buckets thus causing cavitation in the system and upsetting the fluid circulating pattern. In such event, the casing sections 78 and 80 of the fluid unit 10 may be rotated in order to develop a centrifugal force in that portion of the fluid within the casing sections 78 and 80 which opposes the downward and inward flow of the fluid due to its velocity. In addition, rotation of the casing sections increases the dissipation of heat through operation of the internal and external cooling means, it being understood that when the casing sections are rotated cooling air will be circulated between the air blower fins 101 by way of inlets 102 and 104 and outlets 106 and 108, cooling air also passing through ducts 92 and 94 by way of the hollow fluid guide vanes 96.

More particularly, in the event the operator desires to reduce the velocity of the fluid exhausting from the exhaust heads 54 and 56, the member 170 is moved toward position A in order to partially close the valves 168 and cause rotation of the rotor 132 and casing sections 78 and 80 of the fluid unit as heretofore pointed out. Since approximately one-half of the working fluid in each of the paths 58 and 60 is located in the impeller and turbine wheel area while the other half is disposed in the casing sections 78 and 80 between the guide member 88 and the casing hub 138, it will be readily understood that the portion of the fluid within such casing sections will be subjected to centrifugal force, upon rotation of said sections, in order to decrease the radially inward exhaust velocity of the fluid. Since the amount of torque transmitted by the unit 10 depends upon the velocity and the weight of the fluid, it is readily apparent that by controlling the speed of rotation of the casing sections 78 and 80, through the drive unit 120, which in turn controls the velocity of the fluid within the fluid unit 10, the torque output of the fluid unit may be infinitely variable or stopped.

Thus it is seen that as the valves 168 of the drive unit 120 are gradually closed, the speed of rotation of the casing of the fluid unit 10 is gradually increased in order to decrease the torque output and increase the dissipation of heat from the working fluid. In the event that the casing of the fluid unit 10, is rotated at a speed slightly below the speed of the impellers, the velocity of the fluid is at a minimum and the unit then functions as a fluid coupling.

Should the operator desire to disconnect the driving shaft 12 from the driven shaft 14 while the fluid unit is in operation, it is only necessary to move the control member 170 to the position A to close the valves 168. Under these conditions, the rotor 132 and casing sections 78 and 80 are hydraulically locked to the impellers 20 and 22, so that these parts all rotate at the same speed. Under these conditions, the fluid guide members 96 on each side of the unit function as impeller blades to force the fluid radially outward and through the space between the fluid guide rings 88 and the impeller heads 54, 56 into the chamber 90, thus withdrawing the fluid from the working circuits 58 and 60 and effectively disconnecting the driving shaft 12 from the driven shaft 14.

Figure 4:
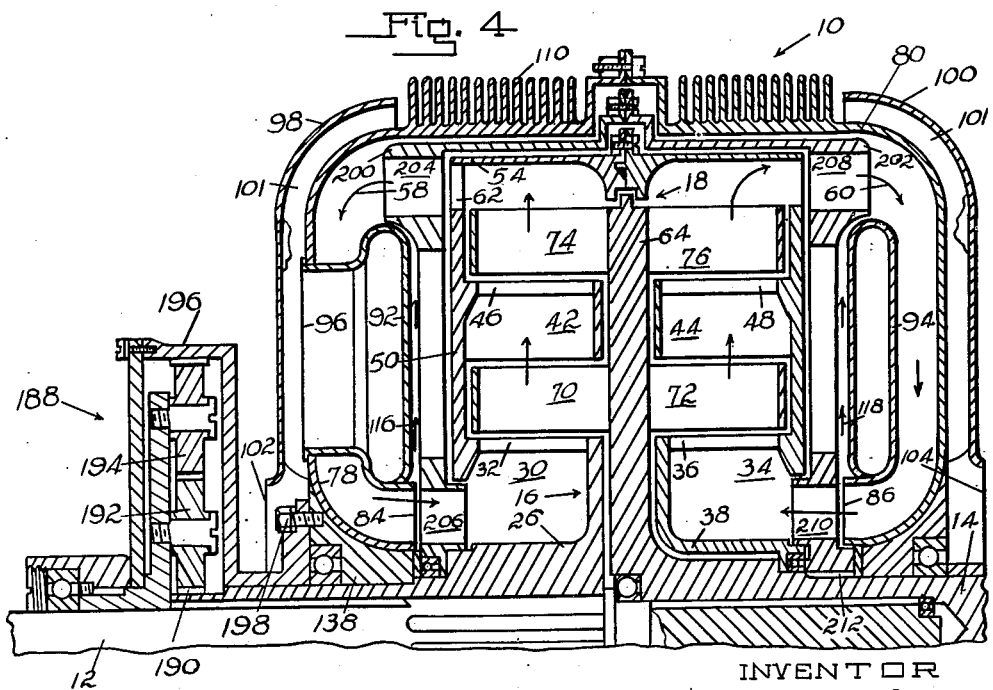
Fig. 4 is a partial axial sectional view of a modified form of hydraulic transmission including an additional turbine stage.

Fig. 4 shows a modified form of the invention which is especially adapted for installations where all of the factors such as the speed of the driving and driven shafts and the required torque delivery are known. Therein, the casing sections 78 and 80 of the fluid unit 10 are rotated at a constant speed by means of a suitable planetary gear set 188, the arrangement being such that the primary impeller hub 26 forms a sun gear 190, which through planetary gears 192 and 194, drives the internal gear 196 which is secured to casing 78 by screws 198. Thus the fluid unit 10 operates at constant speed to deliver a known torque to the driven shaft 14, under the known conditions.

A further modification of the invention is included in Fig. 4, the same comprising a second set of forward and rear turbine wheels 200 and 202, which are joined together at their periphery. As shown, the forward turbine 200 is rotatably mounted with respect to the primary impeller and is provided with a series of blades 204 for receiving the high velocity fluid issuing from the exhaust head 54, an additional series of blades 206 being provided between the entrance 84 and the forward primary buckets 30. In like manner, the turbine wheel 202 is provided with blades 208 and 210 and is keyed or splined to the driven shaft 14 at 212. Thus with this construction additional torque is imparted to the turbine wheels 200 and 202 and an exceedingly high efficiency of operation is achieved. While the additional turbine wheels 200 and 202 have been illustrated as combined with the planetary gear set 188, it will be understood that if desired, such additional turbine wheels may be incorporated in the structure of Figs. 1 and 2.

Fig. 5 shows an arrangement whereby a continuous stream of air may be positively forced through the interior of the cooling chambers 92 and 94. With such an arrangement the chamber 92, for example would be suitably attached to the casing section 78 and the vanes 96 of Fig. 1 would not be utilized. An air inlet 214 and an air outlet 216 is formed by a partition 218 which extends beyond the casing 98 to form a scoop head 220. Thus as the casing is rotated, air is forced into the inlet 214, around the annular chamber 92 and exhausted at the outlet 216. It will be understood that a similar construction may be provided for the chamber 94.

There has thus been provided by the present invention, a novel hydraulic transmission of the rotary type which is highly efficient over a wide range of operating conditions. The fluid unit comprises a plurality of cooperative elements including multiple units such as primary, secondary, and in same cases, tertiary impeller and turbine members which secure a maximum of torque multiplication from the working fluid, and the arrangement is such as to avoid the idle fluid pockets and metallic heat reservoirs of the prior art. Due to the use of the novel internal and external cooling means, a unitary and compact arrangement is secured without the necessity of resorting to extraneous pumps and external radiator arrangements for dissipation of heat. The incorporation of the drive unit of the infinitely variable type with the fluid unit secures an unusually flexible system capable of meeting a wide range of operating conditions to secure a highly efficient transmission and multiplication of torque at variable driving shaft speeds, or under the control of the casing driving unit 120.

While several forms of the invention have been illustrated and described herein, with considerable particularity, it will be readily understood by those skilled in the art that various changes in the construction and arrangement of the parts may be resorted to without departing from the spirit of the invention. For example, if desired, the controlling valves 168 of the drive unit 120, may be controlled by a suitable speed-responsive device operable in accordance with changes in speed of the driving or driven shafts, instead of being controlled by the normally operable member 170. It will also be understood that should the unit be installed on a motor vehicle, the valves 168 may be operated by any controlling member of the vehicle, such as for example, the accelerator pedal, clutch or brake pedals, or a separate control member, if desired. Other variations in construction may also be made within the scope of the invention. Reference will therefore be had to the appended claims for a definition of the limits of the invention.

What is claimed is:

1. A fluid power transmitting device comprising a driving member and a driven member, a compound impeller unit drivably connected with the driving member and having a pair of axially displaced primary members and a pair of secondary members spaced radially outwardly from the primary members, a compound turbine unit drivably connected with the driven shaft and having a pair of primary members respectively interposed between the pairs of radially spaced primary and secondary impeller members, said impeller and turbine members cooperating to form the first portions of a pair of closed fluid working circuits, means including a casing for forming the second and closing portions of said working circuits, and means for rotating said casing to withdraw the fluid from said working circuits without removing the fluid from said casing.

2. A fluid power transmitting device comprising a driving member and a driven member, a compound impeller unit drivably connected with the driving member and having a pair of axially displaced primary members and a pair of secondary members spaced radially outwardly from the primary members, a compound turbine unit drivably connected with the driven shaft and having a pair of primary members respectively interposed between the pairs of radially spaced primary and secondary impeller members, and a pair of secondary turbine members respectively spaced radially outwardly from the secondary impeller members, said impeller and turbine members cooperating to form the first portions of a pair of closed fluid working circuits, means including a casing for forming the second and closing portions of said working circuits, and means for rotating said casing to withdraw the fluid from said working circuits without removing the fluid from said casing.

3. A fluid power transmitting device comprising a driving member and a driven member, a compound impeller unit drivably connected with the driving member and having a pair of axially displaced primary members and a pair of secondary members spaced radially outwardly from the primary members, a compound turbine unit drivably connected with the driven shaft and having a pair of primary members respectively interposed between the pairs of radially spaced primary and secondary impeller members, and a pair of secondary turbine members respectively spaced radially outwardly from the secondary impeller members, an impeller exhaust head for receiving fluid discharged from said secondary turbine members, said impeller and turbine members and exhaust heads cooperating to form the first portions of a pair of closed fluid working circuits, means including a casing for forming the second and closing portions of said working circuits, and means for rotating said casing to withdraw the fluid from said working circuits without removing the fluid from said casing.

4. A fluid power transmitting device comprising a casing containing a driving member and a driven member, a compound impeller including a pair of units drivably connected with the driving member and each comprising primary, secondary and tertiary members spaced apart in a radially outward direction, a compound turbine including a pair of units drivably connected with the driven member and each comprising primary and secondary members respectively interposed between the primary and secondary impeller members and between the secondary and tertiary impeller members, a variable speed clutch for connecting said casing to said driving member for rotation thereby, and means for holding said casing stationary.

5. A fluid power transmitting device comprising a driving member and a driven member, a compound impeller including a pair of units drivably connected with the driving member and each comprising primary, secondary and tertiary members spaced apart in a radially outward direction, and a compound turbine including a pair of units drivably connected with the driven member and each comprising primary and secondary members respectively interposed between the primary and secondary impeller members and between the secondary and tertiary impeller members, said impeller and turbine units cooperating to form the first portions of a pair of closed fluid working circuits, means including a casing for completing said fluid working circuits, and means for rotating said casing to withdraw the fluid from said working circuits without removing the fluid from said casing.

6. A fluid power transmitting device comprising a rotatable impeller unit having a pair of radially spaced primary and secondary impeller members for directing fluid radially outwardly, a turbine unit having a bladed primary member interposed between the primary and secondary impeller members and having also, a secondary turbine member positioned radially outwardly of the secondary impeller member, a casing for receiving fluid from the secondary turbine member and for returning the fluid to the primary impeller member, and means for rotating said casing to withdraw the fluid from said working circuits without removing the fluid from said casing.

7. A fluid power transmitting device comprising a rotatable impeller unit having a pair of radially spaced primary and secondary impeller members for directing fluid radially outwardly, and also having a rotating exhaust member spaced radially outwardly from the secondary member for directing the radial flow in an axial direction, a turbine unit having a bladed primary member interposed between the primary and secondary impeller members, a bladed secondary turbine member interposed between the secondary impeller member and the rotating exhaust member, and a bladed tertiary turbine member for receiving the fluid flowing in said axial direction from the rotating exhaust member, and a casing for receiving fluid from the tertiary turbine member and for returning the fluid to the primary impeller member.

8. A fluid power transmitting device comprising a rotatable impeller unit having a pair of radially spaced primary and secondary impeller members for directing fluid radially outwardly, and also having a rotating exhaust member spaced radially outwardly from the secondary member for directing the radial flow in an axial direction, a turbine unit having a bladed primary member interposed between the primary and secondary impeller members, a bladed secondary turbine member interposed between the secondary impeller member and the rotating exhaust member, and a tertiary turbine member having a bladed portion acted upon by the fluid flowing in said axial direction and issuing from the rotating exhaust member and also having another bladed portion positioned adjacent the primary impeller member, and a casing for receiving fluid from the first bladed portion of the tertiary member and for returning fluid to the primary impeller member through the second bladed portion of the tertiary member.

9. A fluid power transmission device comprising a multi-stage impeller unit and a multi-stage turbine unit, each of said units including parts for directing the flow of fluid radially outwardly, means rotatable with said impeller unit for directing the radial flow in an axial direction, a casing for returning the fluid to the impeller unit, and means for rotating said casing to withdraw the fluid from said working circuits without removing the fluid from said casing.

10. A fluid power transmission device comprising a multi-stage impeller unit and a multi-stage turbine unit, each of said units including parts for directing the flow of fluid radially outwardly, means rotatable with said impeller unit for directing the radial flow in an axial direction, a bladed member connected with said turbine unit and arranged to be acted upon by the fluid flowing in said axial direction, and a casing for returning the fluid from said bladed member to the impeller unit.

11. A fluid power transmitting device comprising a driving member and a driven member, a compound impeller unit drivably connected with the driving member and having a pair of axially displaced primary members and a pair of secondary members spaced radially outwardly from the primary members, a compound turbine unit drivably connected with the driven shaft and having a pair of primary members respectively interposed between the pairs of radially spaced primary and secondary impeller members, said impeller and turbine members cooperating to form the first portions of a pair of closed fluid working circuits, means including a casing for forming the second and closing portions of said working circuits, means for rotatably mounting said casing with respect to said turbine unit and means for dissipating heat generated in said circuits including interior cooling chambers positioned within each circuit and communicating with the atmosphere through hollow fluid guide vanes, said vanes being respectively positioned in said working circuits.

12. A fluid power transmitting device comprising a driving member and a driven member, a compound impeller including a pair of units drivably connected with the driving shaft and each comprising primary, secondary and tertiary members spaced apart in a radially outward direction, and a compound turbine including a pair of units drivably connected with the driven shaft and each comprising primary and secondary members respectively interposed between the primary and secondary impeller members, and between the secondary and tertiary impeller members, a casing surrounding said impeller and turbine and cooperating with said units to define a pair of closed fluid working circuits, means for rotatably mounting said casing with respect to said turbine unit, and means for dissipating heat generated in said circuits including interior cooling chambers positioned within each circuit and communicating with the atmosphere through hollow fluid guide vanes, said vanes being respectively positioned in said working circuits.

13. A fluid power transmitting device comprising a rotatable impeller unit having a pair of radially spaced primary and secondary impeller members for directing fluid radially outwardly, a turbine unit having a bladed primary member interposed between the primary and secondary impeller members and having also, a secondary turbine member positioned radially outwardly of the secondary impeller member, a casing for receiving fluid from the secondary turbine member and for returning the fluid to the primary impeller member, the fluid thus following a closed circuit, means for rotatably mounting said casing with respect to said turbine unit, and means communicating with the atmosphere and disposed within the central portion of said circuit for dissipating heat generated in the fluid, said means including hollow fluid guide vanes positioned in that portion of the closed circuit defined by said casing.

14. A hydraulic power transmission mechanism having driving and driven shafts, a casing containing a working fluid, said casing being rotatably mounted with respect to said shafts, means providing a closed working circuit for the working fluid of substantially toroidal form wherein the working fluid flows radially outwardly in one portion of the circuit and radially inwardly in the other portion of the circuit, an impeller member connected with the driving shaft to circulate the working fluid, a turbine member connected with the driven shaft and positioned in the path of the circulating fluid, a hollow ventilating chamber positioned within the path of the working circuit and communicating with the atmosphere exteriorly of the casing, and means for rotating said casing for creating a circulation of air around the casing and through the ventilating chamber for dissipating heat generated in the fluid during operation of the mechanism, said last named means comprising an infinitely variable clutch mechanism connectible between the driving shaft and the casing.

15. A hydraulic power transmission mechanism as defined in claim 14 which comprises in addition, a hollow, annular chamber positioned within the central portion of the working circuit and communicating with the atmosphere exteriorly of the casing through said hollow ventilating chamber.

16. A hydraulic power transmission mechanism having driving and driven shafts, a casing containing a working fluid, said casing being rotatably mounted with respect to said shafts, means providing a closed working circuit for the working fluid of substantially toroidal form wherein the working fluid flows radially outwardly in one portion of the circuit and radially inwardly in the other portion of the circuit, an impeller member connected with the driving shaft to circulate the working fluid, a turbine member connected with the driven shaft and positioned in the path of the circulating fluid, an interior chamber positioned within the central portion of the working circuit, an air scoop carried by said casing and communicating with said chamber, and means for rotating said casing to force cooling air through said scoop and chamber to dissipate heat generated in the fluid during operation of the mechanism.

17. A hydraulic power transmission mechanism having driving and driven shafts, a casing containing a working fluid, an impeller member connected with the driving shaft and rotatable thereby to circulate the working fluid in a closed path, a turbine member connected with the driven shaft and positioned in the path of the circulating fluid, a plurality of fluid guide members positioned substantially parallel to the impeller member and positioned in the path of the circulating fluid, means for rotatably mounting said fluid guide members with respect to the driving and driven shafts, means for holding the fluid guide members stationary, and infinitely variable clutch mechanism operable at will for connecting said fluid guide members to the driving shaft for rotation thereby at varying speeds ranging from zero to the speed of rotation of the driving shaft to variably control the circulation of working fluid in response to the rotation of the fluid guide members.

18. A hydraulic power transmission mechanism as set forth in claim 17 wherein the casing is rotatably mounted with respect to the driving and driven shafts and the fluid guide members are carried by the casing.

19. A fluid power transmission comprising a rotatable casing, an impeller and a turbine within the casing for establishing a circulation of working fluid in a closed path for the transmission of torque, said fluid flowing radially outwardly through the impeller and turbine and then flowing radially inwardly in the casing and back to the impeller, and variable transmission means interconnecting the impeller and casing for rotating the latter at variable speeds to subject that portion of the fluid in the casing to the action of centrifugal force to vary the velocity of the fluid flow.

20. A hydraulic fluid power transmission mechanism having driving and driven shafts, a casing containing a working fluid, said casing being rotatably mounted with respect to said shafts, an impeller and a turbine within the casing for establishing a circulation of working fluid in a closed path for the transmission of torque, said casing being provided with a plurality of fluid guide members extending into the path of the circulating fluid and positioned substantially parallel to said impeller and also having an internal, annular chamber on the inner periphery thereof, and an infinitely variable clutch mechanism connectible with the casing and the driving shaft and operable at will to rotate the casing and said fluid guide members at a speed sufficient to cause all the fluid, under the influence of the rotating fluid guide members to flow into said annular chamber to interrupt the transmission of torque.

21. A fluid power transmission mechanism having a driving member, a driven member, and a casing, a multi-stage impeller connected with the driving member and rotatable thereby to circulate a working fluid in a closed path in the casing, a multi-stage turbine connected with the driven member and positioned in the path of the circulating fluid to be rotated thereby, said impeller having a plurality of stages operable to increase the velocity of the circulating fluid after the fluid has passed through each stage of said turbine, said impeller including a final stage for exhausting the fluid after it has passed through all the turbine stages, at a velocity greater than the initial velocity imparted to the fluid by the first stage of the impeller, and means including a plurality of fluid guide vanes for guiding the fluid back to the impeller.

22. A fluid power transmission mechanism having a driving member, a driven member, and a casing, a multi-stage impeller connected with the driving member and rotatable thereby to direct a working fluid radially outwardly, a multi-stage turbine connected with the driven member and positioned in the path of the radially directed fluid to be rotated thereby, said impeller having a plurality of stages operable to increase the velocity of the radially directed fluid after the fluid has passed through each stage of said turbine and having a final stage for directing the fluid axially at an increased velocity, and means including a plurality of fluid guide vanes for guiding the axially directed fluid back to the impeller.

23. A fluid power transmission mechanism having a driving member, a driven member, and a casing, a compound impeller comprising a pair of axially aligned multi-stage impeller units connected with the driving member and rotatable thereby to circulate a working fluid in a pair of closed paths in the casing, a compound turbine comprising a pair of axially aligned multi-stage turbine units connected with the driven member and respectively positioned in the paths of the circulating fluid to be rotated thereby, said impeller units having a plurality of stages operable to increase the velocity of the circulating fluid in said paths after the fluid has passed through each respective stage of said turbine, and means including a plurality of fluid guide vanes for guiding the fluid in the respective paths back to the impeller units.

24. A fluid power transmission mechanism having a driving member, a driven member, and a casing, a compound impeller comprising a pair of axially aligned multi-stage impeller units connected with the driving member and rotatable thereby to direct a working fluid radially outwardly in a pair of paths, a compound turbine comprising a pair of axially aligned multi-stage turbine units connected with the driven member and respectively positioned in said paths to be rotated thereby, each of said impeller units having a plurality of stages operable to increase the velocity of the radially directed fluid in said paths after the fluid has passed through each respective stage of said turbine and having a final stage for directing the fluid axially at an increased velocity, and means including a plurality of fluid guide vanes for guiding the axially directed fluid back to the impeller units.

25. A fluid power transmission mechanism having a driving member, a driven member, and a casing, a multi-stage impeller connected with the driving member and rotatable thereby to circulate a working fluid in a closed path in the casing, a multi-stage turbine connected with the driven member and positioned in the path of the circulating fluid to be rotated thereby, said impeller having a plurality of stages operable to increase the velocity of the circulating fluid after the fluid has passed through each stage of said turbine, said impeller including a final stage for exhausting the fluid after it has passed through all the turbine stages, at a velocity greater than the initial velocity imparted to the fluid by the first stage of the impeller, means including a plurality of fluid guide vanes for guiding the fluid back to the impeller, and means independent of the speed of rotation of the driving member for controlling the velocity of circulation of the fluid at will.

26. A fluid power transmission mechanism having a driving member, and a driven member, and a casing, an impeller connected to the driving member and rotatable thereby to circulate a working fluid in a closed path in the casing, a turbine connected to the driven member and positioned in the path of the circulating fluid to be rotated thereby, a hollow interior ventilating chamber positioned in contact with the circulating fluid and arranged within said closed path, a plurality of fluid guide members to guide the circulating fluid back to the impeller, said fluid guide members being connected with the casing and chamber to support the latter and being hollow and communicating with the atmosphere exteriorly of the casing and with the chamber for ventilating the latter, and means for rotating the casing at will, said fluid guide members serving as impeller blades during rotation of the casing.

27. A fluid power transmission mechanism as set forth in claim 26, which comprises in addition, means for circulating air around the casing and through the chamber during rotation of the casing, comprising a plurality of air blower vanes secured to the exterior of the casing, a cover plate adjacent the blower vanes, said plate having an air intake opening and an air exhaust opening, and means for communicating the hollow fluid guide members with the circulating air.

28. A fluid power transmission as set forth in claim 27 in which the cover plate is secured to the casing for rotation therewith.

EDWARD JOHN THURBER.

REFERENCES CITED

The following references are of record in the file of this patent:

UNITED STATES PATENTS

| Number | Name | Date |
| --- | --- | --- |
| 1,291,871 | Hein | Jan. 21, 1919 |
| 1,319,752 | Brown | Oct. 28, 1919 |
| 1,327,080 | Brown | Jan. 6, 1920 |
| 1,551,055 | Rieseler | Aug. 25, 1925 |
| 2,050,550 | Yingling | Aug. 11, 1936 |
| 2,084,312 | Astafiev | June 22, 1937 |
| 2,137,139 | Keller | Nov. 15, 1938 |
| 2,150,539 | Carson et al. | Mar. 14, 1939 |
| 2,185,491 | Anderson et al. | Jan. 2, 1940 |
| 2,205,794 | Jandasek | June 25, 1940 |
| 2,255,430 | Lysholm et al. | Sept. 9, 1941 |
| 2,266,085 | Sanderson | Dec. 16, 1941 |
| 2,294,768 | Black et al. | Sept. 1, 1942 |
| 2,333,053 | Stroehlen | Oct. 26, 1943 |
| 2,343,786 | Martin | Mar. 7, 1944 |
| 2,379,015 | Lysholm | June 26, 1945 |
| 2,381,682 | Mayner | Aug. 7, 1945 |
| 2,428,005 | Bennett | Sept. 30, 1947 |
| 2,465,739 | McGill | Mar. 29, 1949 |